Oct. 27, 1970   R. A. HOËT   3,535,758
METHOD OF MACHINING PERFORATE ELECTRODES
FROM PYROLYTIC GRAPHITE

Filed Feb. 28, 1968   6 Sheets-Sheet 1

Oct. 27, 1970 R. A. HOËT 3,535,758
METHOD OF MACHINING PERFORATE ELECTRODES
FROM PYROLYTIC GRAPHITE
Filed Feb. 28, 1968 6 Sheets-Sheet 2

ROGER A. HOËT,
Inventor
by Stephen H. Frishauf
Atty

Oct. 27, 1970    R. A. HOËT    3,535,758
METHOD OF MACHINING PERFORATE ELECTRODES
FROM PYROLYTIC GRAPHITE
Filed Feb. 28, 1968    6 Sheets-Sheet 6

United States Patent Office 3,535,758
Patented Oct. 27, 1970

1

3,535,758
METHOD OF MACHINING PERFORATE ELECTRODES FROM PYROLYTIC GRAPHITE
Roger A. Hoët, Thonon-les-Bains, France, assignor to Compagnie Francaise Thomson Houston - Hotchkiss Brandt, Paris, France, a corporation of France
Filed Feb. 28, 1968, Ser. No. 708,999
Claims priority, application France, Mar. 7, 1967, 97,682
Int. Cl. H01j 9/16, 9/44
U.S. Cl. 29—25.18                             8 Claims

ABSTRACT OF THE DISCLOSURE

A cylindrical electrode blank (10) of pyrolytic graphite is surrounded by a perforate mask (13) and is exposed to an abrading jet (15) which is traversed longitudinally while the blank is rotated about its axis.

---

This invention relates to the manufacture of electrodes for electron discharge devices and the like, out of pyrolytic graphite.

The use of molecularly oriented graphite, also known as pyrolytic graphite, in the construction of grid electrodes for electron discharge devices is a fairly recent development in the art, see inter alia U.S. Pat. 3,307,063 assigned to be same company as the present application.

Grid electrodes made of pyrolytic graphite possess outstanding advantages over electrodes made of more conventional materials. Most of these advantages are due to the highly anisotropic physical properties of the molecularly oriented layers, including very high thermal and electrical conductivity in directions parallel to the layers coupled to low conductivity normally to the layers.

However, this very anisotropy which is responsible for the advantages of pyrolytic graphite electrodes in operation, at the same time brings with it a serious difficulty in the manufacture of such electrodes. That is, the anisotropy is reflected in the mechanical properties of pyrolytic graphite in that, while the tensile strength of such graphite parallel to the molecular layers surfaces is high, the hardness as measured normal to said surfaces is very low. Great difficulties have consequently been experienced in machining pyrolytic graphite blanks into the final desired perforate electrode shapes by conventional methods. In most such methods, frequent chipping is impossible to avoid and the number of rejects is considerable, greatly increasing manufacturing costs.

Abrasion-processing methods using jets of fine particles of abrading substance suspended in a stream of gas or liquid have already been proposed in connection with the treatment of hard substances including ceramics, hard metals and carbides, as for the production of electric resistors and other electric components. In some cases the use of abrasion-resistant masks has been proposed to protect selected surface areas against the abrasive jet action. In such prior methods, the requirement for very close machining tolerances was usually not present, except possibly in the depth dimension, nor were such close tolerances generally attainable with the materials involved, otherwise than in depth.

Objects of this invention include the provision of methods and apparatus for machining perforate electrodes from pyrolytic graphite with high efficiency, high precision, and a low rate of rejects, and hence high economy.

According to the invention, a blank made of pyrolytic graphite sheet material having a general shape corresponding to that of the final electrode, is exposed to the action of a jet of fine abrading particles through a mask, a relative scanning movement is imparted to the jet relative to

2 the mask and blank, and the process is continued until the exposed regions of the blank have been perforated completely.

By this method it has been found that very close tolerances, of the order of 0.1 mm. and better, can be consistently obtained as measured on the dimensions parallel to the surface of the blank. These results are to be ascribed to the highly anisotropic properties of the pyrolytic graphite, in that it is soft in the direction normal to the blank surface, but hard and tough in the directions parallel to said surface.

Exemplary embodiments of the invention will now be described with reference to the accompanying drawings, wherein.

Pyrolytic graphite is a form of crystalline carbon obtained through thermal decomposition of a gaseous carbon compound such as a gaseous hydrocarbon, on the surface of a supporting base carried to a suitable high temperature of about 2000° C. The carbon deposits on the surface of the base in the form of successive layers of folia. Due to the oriented crystalline build-up of the layers the resulting sheet of graphite exhibits a high degree of anisotropy in its physical characteristics. Thus, its heat (and electrical) conductivity as measured parallel to the layer surface is comparable to that of copper, about three times higher than that of ordinary graphite. Normally to the surface of the layer, the conductivity of oriented graphite is considerably less than that of ordinary graphite.

In recent years the assignee company has pioneered the use of pyrolytic graphite as a constituent material for improved grid electrodes in electron discharge devices. Among the advantages of a grid electrode made of pyrolytic graphite are the following. Owing to the extremely high ratio of longitudinal to normal conductivity, the inherent rate of heat dissipation is vastly increased, so that cooling requirements are reduced and permissible power ratings for the tube are increased. Another though secondary reason for improved heat dissipation is that graphite is an excellent heat radiator. Further, it is light in weight. The tensile strength of a pyrolytic graphite electrode is very high. Moreover, such tensile strength increases with temperature, so that it is actually a maximum at the operating temperature of a high-power electron tube. This property, it should be noted, sets pyrolytic graphite aside from virtually all known materials (including ordinary isotropic graphite) all of which show a curve of tensile strength versus temperature that is drooping, not rising as is the case with pyrolytic graphite.

However the softness of pyrolytic graphite normally to the plane of the deposited crystal layers makes it very friable and difficult to form into a perforate electrode without a high rate of rejects. It should be understood that an ideal grid electrode for an electron discharge device is one having, at the limit, an infinite number of infinitely narrow strips and slots, of predetermined overall opacity. This means that in order to approach such optimal theoretical conditions, a grid must be machined to as fine a mesh pattern as possible. It has been found impractical to do this in the case of pyrolytic graphite electrodes with any conventional machining method. The present invention is based on the finding that, for the very same reason—high anisotropy—that makes pyrolytic graphite a highly attractive material for a grid electrode while at the same time making it difficult to machine economically by most methods, such material is particularly amenable to machining by abrasion using procedures to be described herein. That is, because of the relatively very high ratio of tensile strength to hardness in a pyrolytic graphite electrode blank, a ratio which far exceeds that for any material, it becomes possible to abrade this material economically to within very close dimensional tolerances as measured parallel to the electrode surface. Thus the unique properties of pyrolytic graphite are put to good use in the invention in order to overcome the difficulties heretofore encountered in the production of perforate electrodes made from this material.

Figure 1:
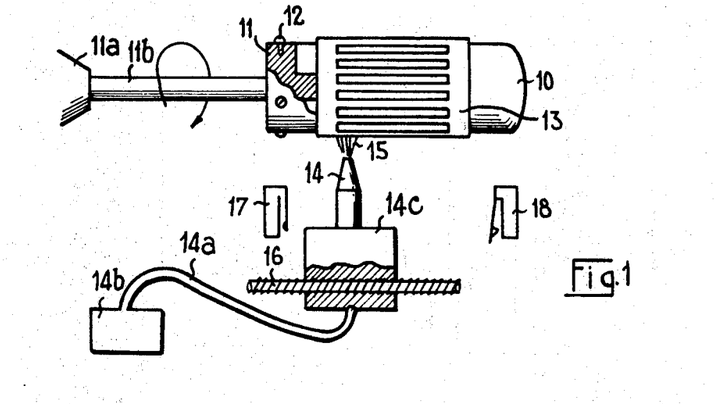
FIG. 1 is a schematic illustration of one apparatus setup for producing a straight-slotted grid according to the invention.

In the embodiment shown in FIG. 1, a blank 10, in the form of a tubular shell closed at one end in this example, is secured around a support 11, e.g. with screws 12 or other fasteners. Support 11 has a shank 11b shown secured in a chuck 11a of a lathe, not shown. Mounted around blank 10, a sliding fit thereon, is a mask 13 in the form of a tube of thin sheet steel or other material having in this example a number of longitudinal slots uniformly formed around its circumference so as to define as many longitudinal strips.

It is understood that the blank 10 is composed of a sheet of pyrolytic graphite produced by a conventional process as later described in detail and has highly anisotropic physical properties. Thus, as regards its mechanical characteristics, such a shell has a relatively high tensile strength in directions parallel to its surface, coupled with very low wear resistance or hardness normal to its surface.

An abrading device which may be generally conventional and is only schematically shown as a unit 14c includes a nozzle 14 projecting therefrom into close proximity with the outer surface of mask 13 as shown. The tip of nozzle 14 may be spaced from the mask surface a distance of the order of about from 0.5 to 5 mm. In operation, nozzle 14 discharges a jet of abrasive powder, e.g. silicon carbide of suitable fine granulometry, from a source 14b, in a stream of pressure fluid, e.g. air at from 4 to 7 atmospheres.

Unit 14c is shown traversable in a direction parallel to the axis of blank 10 and mask 13 by means of a conventional traversing arrangement including a leadscrew 16. Limit stops associated with electric contacts are shown at 17 and 18, and are assumed to be connected in a conventional reversing circuit for reversing the sense of rotation of leadscrew 16 from a motor (not shown), the adjustments being such that the rotation is reversed every time the axis of nozzle 14 reaches a point intermediate an extremity of a slot in mask 13 and the related end of the mask. If desired, means may also be provided for reversing the rotation of spindle 11b whereby to correct for defects in the perpendicular relationship between the nozzle 14 and spindle 11b.

In operatioin, after each axial traverse of abrader unit 14a the sense of rotation of leadscrew 16 is reversed while at the same time rotation is imparted to spindle 11b through conventional means not shown. The procedure is continued over a plurality of complete revolutions of spindle 11b so that each slot in the mask is subjected to a plurality of abrading passes, as many as may be required to ensure that the shell 10 is completely and cleanly perforated in the area of each slot.

Conveniently, the holes in shell 10 for the fasteners 12 are formed using the abrading means shown.

It is preferred that the ratio of displacement be so correlated that the blank 10 is abraded in a large number of relatively quick passes.

Figure 2:
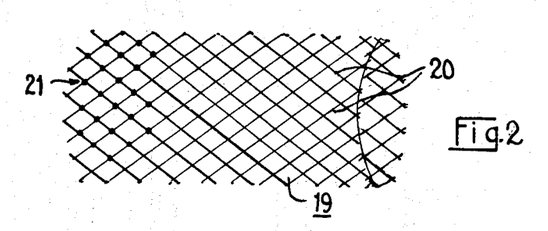
FIG. 2 is a larger-scale fragmentary showing of a wire mesh-type mask usable according to the invention.

The method of the invention is of special utility in the manufacture of lattice-shaped grid electrodes. Thus FIG. 2 shows part of a mask usable in producing such an electrode having a diamond-mesh type lattice. Wires 20 made from a suitably hard material such as tungsten, molybdenum, nickel, tantalum or the like, are wound in two intersecting arrays around a suitable mandrel equal in diameter to that of the blank to be machined, the wires are soldered at their crossing points such as 21, and the resulting mask 19 after removal from the mandrel is slipped round a shell-like blank such as the blank 10 in FIG. 1, the blank in turn being mounted on a support such as 11, and said support being supported by a spindle 11b from the chuck 11a of a lathe. The abrading process is then performed as described with reference to FIG. 1.

Figure 3:
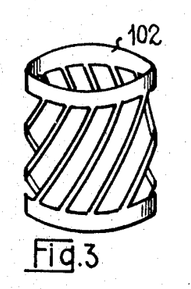
FIGS. 3 and 4 are perspective views showing two cooperating component masks.
Figure 4:
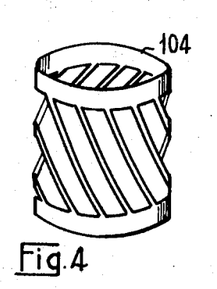
Figure 5:
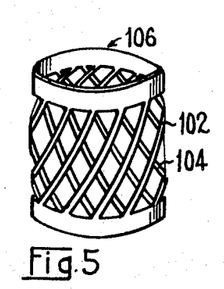
FIG. 5 shows a complete mask produced by the combination of both said component masks, according to a modification of the invention.
Figure 6:
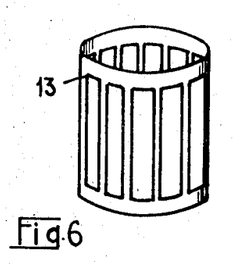
FIGS. 6 and 7 illustrate steps in the production of another form of mask usable according to the invention.

In a modification, a mask for use in producing a diamond-mesh grid by the method of the invention is formed from two parts 102 (FIG. 3) and 104 (FIG. 4), each in the form of a sheet metal tube having helical slots formed therein by any suitable process e.g. milling or molding. The slots are oppositely inclined in the two parts 102, 104, and the two parts differ in diameter so that one, e.g. part 104, can be inserted a close fit in the other part, 102, to provide the composite mask 106 shown in FIG. 5. If so desired parts 102, 104 may be soldered in assembled position. Mask 106 may be used in the same manner as mask 19 of FIG. 2.

Figure 7:
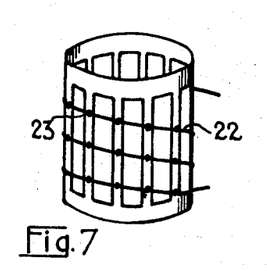
Figure 8:
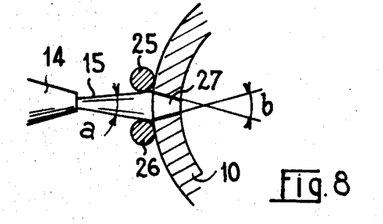
FIGS. 8 to 11 are schematic sectional views showing successive stages in the abrasion-machining of a pyrolytic graphite electrode according to the invention.
Figure 9:
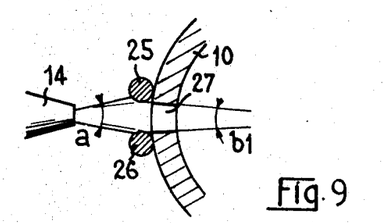
Figure 10:
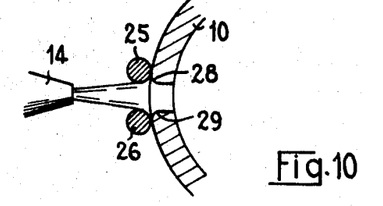

A different form of mask is shown in FIG. 7 as comprising a tubular sheet member 13 having e.g. axial slots formed therein, and a wire 22 wound helically around it and soldered as at 23 to the strips in part 13.

Masks for use in the invention may be made of suitable metal or pastic sheet, and may be shaped to the desired pattern by any conventional means, including molding, stamping, milling, etching, abrading, sparking or otherwise. In view of the very low hardness of pyrolytic graphite normally to its lamellar planes, it is found that the economy of the process of the invention does not require the masks used to be particularly hard and wear-resistent. In some cases however this requirement may be present, as in the case of masks having rather complicated patterns, expensive or difficult to reproduce. In such cases the masks may be coated with a hard protective coating, e.g. nickel, chromium, etc., electrolytically or otherwise. In a convenient form of the invention, the mask may comprise a metal body or base of the desired shape coated with an easily replaceable coating, e.g. plastic, which can be readily regenerated after a number of abrading operations. Similarly the wires such as 20, 22 used in certain embodiments of the invention may be dipped in a protective coating solution, e.g. varnish or nitrocellulose.

Figure 11:
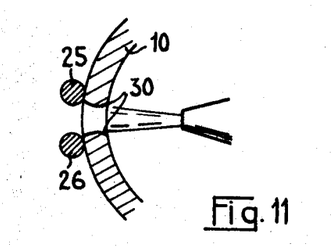

In practicing the method of the invention, it has been found that the time factor is of rather critical importance. Referring to FIGS. 8-11, there is schematically shown the jet 15 of abrading material issuing from nozzle 14, passing through the gap between a pair of adjacent solid portions 25 and 26 of a mask, and then striking and eroding through the wall of blank 10. Jet 15 is shown as a slightly diverging cone of angle *a*. which is constant throughout the process. At an early stage of the abrading process, shown in FIG. 8, it is found that the hole 27 formed through the wall of blank 10 by the abrading particles is strongly tapered or converging, with a cone angle such as *b*. As the abrading is continued, the angle of convergence *b* diminishes, as indicated at *b*1 in FIG. 9. However, as the angle *b* is about to become zero, just before the hole 27 becomes cylindrical, it is found that the outer end of the hole, as at 28–29 assumes a rounded contour as shown. This may be undesirable, especially in the case of thinwalled masks, and in such cases the abrading operation may be stopped just before the hole 27 has become truly cylindrical and the residual taper in hole 27 may be substantially compensated for by performing a relatively short abrading step with the jet directed at the inner side of the blank, as shown in FIG. 11. This creates rounded-off end areas as at 30, counteracting the effect of the taper in the hole or slot 27 and improving the characteristics of the grid when in operation. In the case of cylindrical electrodes of comparatively small diameter, a separate internal abrading step as just described may sometimes be omitted and the normal abrading action of the jet directed at the outer side of the blank may be relied on to erode the inner ends of the diametrically opposed solts sufficiently for the purpose just indicated.

Figure 12:
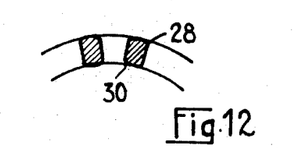
FIGS. 12, 13 and 14 are similar views illustrating further aspects of the invention.
Figure 13:
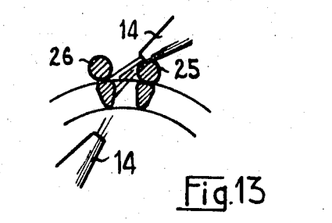
Figure 14:
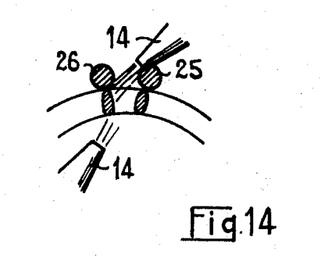

FIG. 12 illustrates the approximate form of the slot contour obtained in a mask according to the invention when dual abrasion both from the outer and inner sides of the blank is used as described in the foregoing paragraph. It will be noted that the slot contour is approximately symmetrical, i.e. rectangular with rounded edges. In some cases it may be desired to impart other cross sectional contours to the slots and intermediate bars or strips of a grid electrode, as for shaping the force lines of the electric field for electron-optical reasons. Such contouring can easily be accomplished by suitably operating the abrading jets. Thus, after the actual slot- perforating operation has been performed through a mask as earlier described, the abrading jet may be directed at predetermined angles and for predetermined lengths of time at the outer and inner surfaces of the blank to produce the rounded-trapezoidal bar contours shown in FIG. 13 or the oval contours shown in FIG. 14, or yet other, e.g. circular bar contours.

Figure 15:
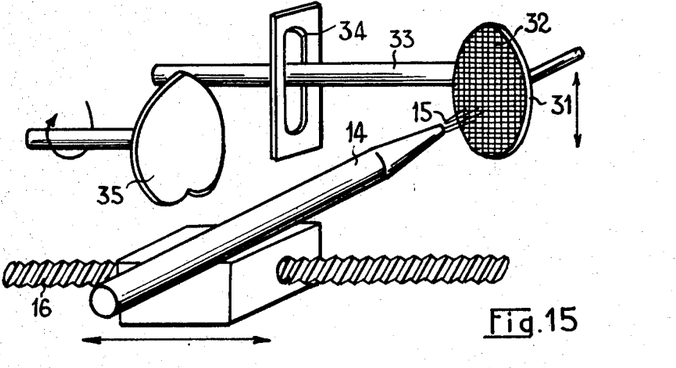
FIG. 15 illustrates a schematic set-up for machining a flat grid according to the invention.

The grid electrodes so far considered were cylindrical in shape, but clearly the invention is not limited thereto. FIG. 15 illustrates the production of a flat, e.g. disc-shaped, grid for use in an electron tube embodying flat electrodes. The disc-shaped blank 31 made of pyrolytic graphite is covered with a square-mesh wire mask 32 of similar shape removably attached thereover and the assembly is mounted at the end of a horizontal arm 33 extending in the general plane of the disc, arm 33 being mounted for up-and-down reciprocation in a vertical guideway 34. The abrading jet nozzle 14 is mounted for reciprocation parallel to arm 33 by way of a lead-screw 16 as in FIG. 1. The reciprocation of arm 33 in guideway 34 is shown as being controlled by means of a revolving cam 35 which may be of heart-shaped contour as shown. The rotation of the camshaft and the reciprocation of the nozzle are synchronized and correlated to produce a uniform scanning relative movement between the abrading jet 15 and blank 31 whereby to perforate the blank at the end of a suitable number of complete scanning cycles so as to produce a grid electrode of a pattern corresponding to the mesh pattern of mask 32 as will be readily understood.

Figure 16:
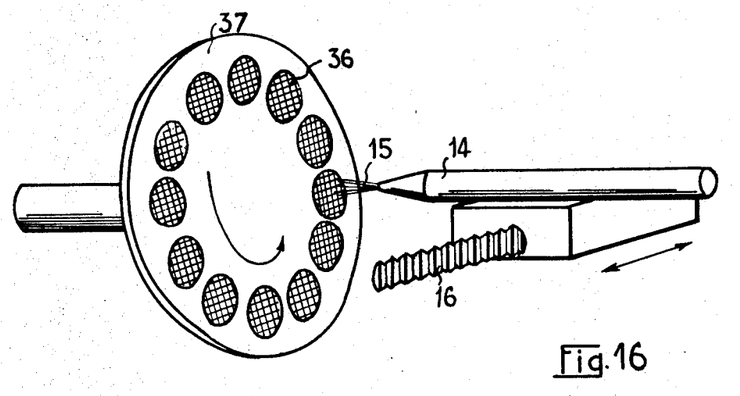
FIG. 16 illustrates the simultaneous machining of a series of flat grid electrodes.

In the modification shown in FIG. 16, the set-up provides for simultaneous abrasion-machining of a plurality of flat disc-shaped grid electrodes of pyrolytic graphite. The array of blanks covered with wire-mesh masks as in FIG. 15 are arranged in a circular array 36 round a supporting disc 37 mounted for rapid rotation on a shaft. The abrader jet nozzle 14 is mounted for reciprocation by way of leadscrew 16 so as to traverse a radial segment of mounting disc 37 which corresponds with and overlaps the radial area of said disc in which the annular array of masked blanks 36 are positioned. The operation is terminated when all of the blanks have been completely perforated in patterns corresponding to the mask mesh.

Figure 17:
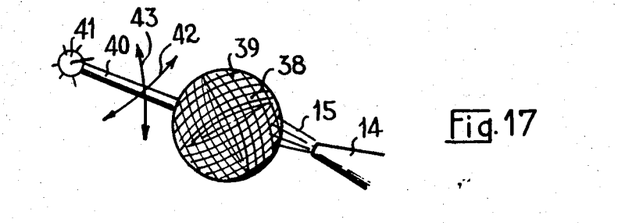
FIG. 17 illustrates the machining of a part-spherical grid.

FIG. 17 illustrates a blank 38 made of pyrolytic graphite in the form of a portion of a sphere. A wire mesh mask 39 of corresponding shape is positioned over the blank 38 and the assembly is secured to one end of an arm 40 extending along a radius of the sphere of which blank 38 forms a portion, at the center of the blank. Arm 40 is swivelled at its other end on a universal pivot 41 positioned at the geometrical center of the sphere. Means, not shown, are provided for imparting to arm 40 a two-directional scanning motion along the arcuate coordinate directions indicated by arrows 42 and 43 in relation to the abrading jet 15 issuing from nozzle 14, which in this embodiment is stationarily mounted in a central radial position as shown. The scanning movements of arm 40 are continued for as many cycles as required to ensure that blank 38 is completely perforated by the abrading jet 15 in the areas between the mesh wires of mask 39.

As mentioned earlier, the mask instead of being formed separately from the blank may be formed directly on the surface of the blank. For example, the blank surface may be coated, as by means of a brush, with a photosensitive varnish composition and the coating allowed to dry in the dark. The coated blank may then be exposed to a source of suitable radiations (e.g. ultraviolet or visible light) through a mask similar in pattern to that of the mask it is desired to form on the blank. After exposure the coated blank is dipped in a suitable solvent, e.g. trichloroethylene, for dissolving away the unexposed varnish. Thereafter the blank may be passed through an electroplating bath to coat the areas thereof that were laid bare in the dissolving step, with a suitable metal coating such as copper and possibly other metals such as nickel, chromium or the like in cases where it is desired to impart high abrasion-resistant properties to the mask. At this point it will be realized that there has been formed on the blank made of pyrolytic graphite a metallic mask directly deposited thereon having the prescribed pattern. After the masked blank has been subjected to the abrading process as described herein with reference to any of FIGS. 1 and 15–17, the metal plating constituting the mask is preferably removed as by dipping the article in a suitable acid etching bath, whereupon the resulting electrode will consist exclusively of pyrolytic graphite, with all the advantages thereof.

The process just described is applicable both to flat electrodes and to electrodes of curved configuration. In the case of a cylindrical electrode for example, the irradiating step may conveniently be performed by mounting the varnish-coated blank on an axial spindle and rotating it in relation to the radiation source.

Other procedures will readily be conceived for forming a mask directly on the surface of a pyrolytic graphite blank for the purposes of the invention. As one alternative, the blank may first be copper-plated and the mask pattern then etched thereon by photo-engraving. Or again, the desired mask pattern can be formed on the blank surface with a polymerizable resin, by a serigraphic process or otherwise, and the resin polymerized in situ by any suitable means.

Figure 18:
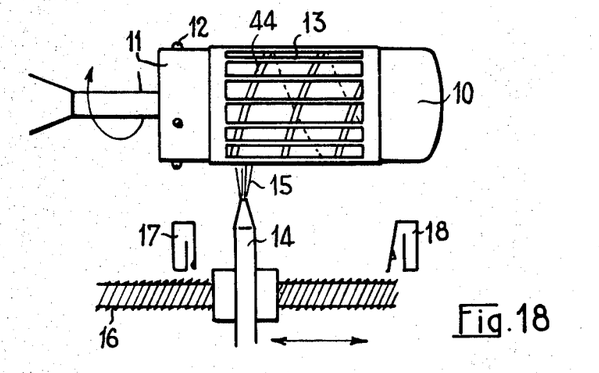
FIG. 18 illustrates a modified procedure using a partial mask.

In certain embodiments of the invention, the mask used may be shaped to mask only part of the area of the blank that is to be protected from abrassion. Thus, the embodiment of FIG. 18 shows a set-up that is largely similar to that of FIG. 1 so that it need not be described in detail. As shown the blank 10 of pyrolytic graphite is surrounded by a tubular mask 13 formed with axial slots and strips, as in FIG. 1. In this case however the rotation of shank 11, driven e.g. from a lathe spindle, is effected at a rate so correlated with the rate of axial traverse of nozzle 14 on leadscrew 16, that the abrading jet 15 cuts into the blank 10 along a helical path 44 of predetermined pitch. The resulting pattern cut out in the blank will then be a mesh-type pattern generally similar to that obtained when using a mask of the kind shown in FIG. 7. If desired, the position of nozzle 14 may be displaced by a predetermined axial amount at each of a series of passes in order to form more than one intertwined helical cuts such as 44.

Conversely, the mask 13 might take the form of one or more helical strips wound around the cylindrical blank 10, or again that of a plurality of circumferential strips (e.g. elastic bands) surrounding the blank, while the movements of spindle 11 and screw 16 are correlated to impart to jet 15 a selected path of relative movement with respect to the blank. For example, said path may be a helix of reverse pitch from that of the mask helix (if such is used); or said path may be a circumferential set of equispaced axial lines, in which case the spindle 11 would preferably be mounted for indexed rather than continuous rotation.

Figure 19:
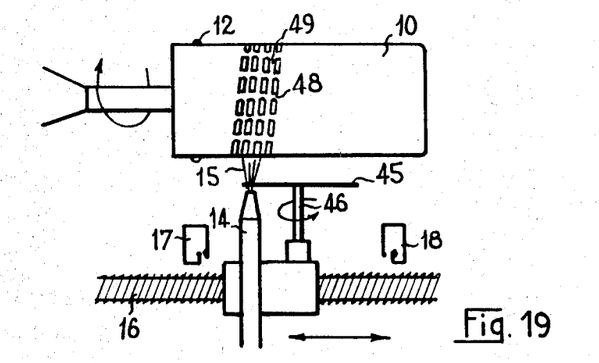
FIG. 19 shows a modification using a mask in the form of a revolving obturator disc.
Figure 20:
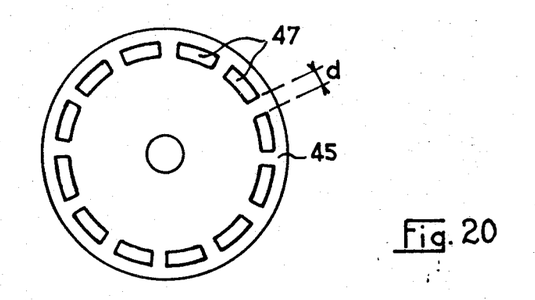
FIG. 20 is a front view of the obturator disc in FIG. 19.

The embodiment shown in FIG. 19 uses a general set-up similar to that of FIGS. 1 and 18, but in this case the mask 13 is omitted. Instead there is provided a perforated obturator disc 45 mounted for rotation on a shaft 46 which is mounted for bodily displacement with the abrading jet nozzle 14 as shown. As shown in FIG. 20, the obturator disc 45 has a circumferential series of holes or slots 47 formed round it, the arrangement being such that the holes 47 move past the orifice of jet nozzle 14 during rotation of the disc 45. As in the previous embodiment, the rates of rotation of blank 10 and screw 16 are so correlated that jet 15 traces out a helical cut round the blank 10. Simultaneously disc 45 is rotated, through any means not shown synchronized with the rotation of the blank, so that the abrading jet 15 is intermittently intercepted. The rates of rotation of the blank and screw are so correlated that during every revolution of blank 10 the nozzle 14 is axially advanced a distance equal to the radial width of a perforation 47 plus a prescribed amount corresponding to the axial width of a solid helical portion such as 49 between adjacent turns of the helical cut. The circumferential length (as measured round blank 10) of the axially extending solid portions such as 48 is determined by the distance $d$ (FIG. 20) between perforations 47. In this way it will be seen that a mesh-type grid electrode generally similar to that obtainable with the mask of FIG. 7 can be produced.

In the field of electron tube construction it is often required to provide two or more grid electrodes having their corresponding voids and solid areas or strips aligned in precisely registering relation. This has raised difficult problems in the past, and the invention greatly simplifies such multiple grid construction.

Figure 21:
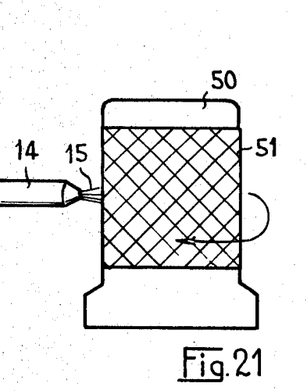
FIGS. 21 and 22 show two steps in a further modification.
Figure 22:
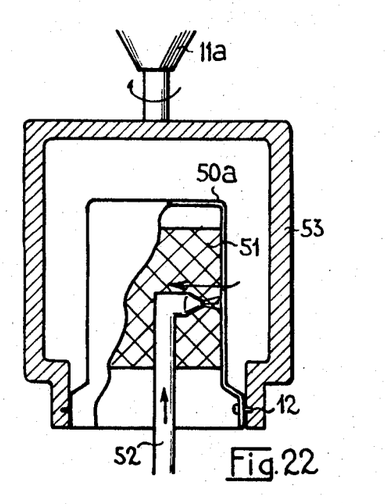

Assume for example it is desired to make a coaxial cylindrical pair of grids for a tetrode. According to the embodiment of the invention shown in FIGS. 21 and 22, there is used a single mask 51, e.g. of the wire mesh type shown or any of the other types earlier referred to herein, having a wall thickness corresponding to the radial inter-grid spacing in the finished tube. The inner (or control) grid is first produced from a tubular blank of pyrolytic graphite by mounting mask 51 round said blank and using the general procedure described e.g. with reference to FIG. 1. The mask 51 is then removed from the completed inner grid, and is inserted into another tubular blank 50a (FIG. 22) made of pyrolytic graphite, in order to form the outer (or screen) grid. For this operation the blank 50a with mask 51 inserted therein is secured for rotation about its geometric axis, in a rotatable sleeve 53 which as shown engages the external surface of the enlarged base of blank 50a. An abrading jet nozzle 52 of the L-shape shown projects axially into the open end of blank 50a and mask 51 and has its discharge orifice directed radially as shown. Means, not shown, are provided for reciprocating nozzle 52 axially of the blank so as to scan the surface of mask 51 during rotation thereof. With this arrangement, it will be evident that the two finished electrodes will be formed with accurately corresponding and registrable mesh patterns, since a common mask was used in forming both patterns.

Figures 23, 24:
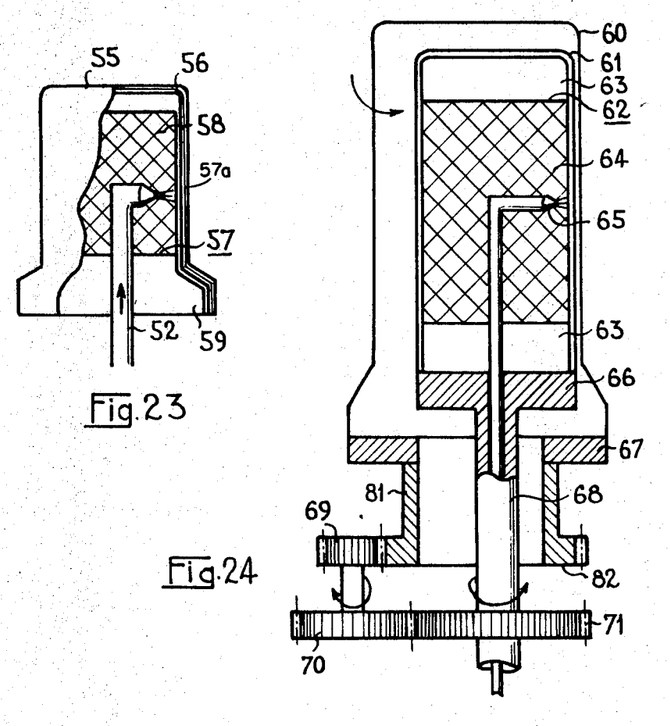
FIG. 23 and FIG. 24 illustrate two respective further modifications of the invention.

In the modified embodiment shown in FIG. 23, the tubular blanks 55 and 56, both made of pyrolytic graphite and which are to form the outer and the inner grid electrodes respectively, are machined simultaneously. For this purpose blanks 56 and 55 are rotatably mounted on a common jig (not shown) in the same coaxial relationship as the final grid electrodes are to be mounted in the assembled tube. A tubular mask 57 is positioned within the inner blank 56 in closely spaced relation therewith. A further mask 57a may be provided, the purpose of which will be described hereinbelow. Mask 57, made e.g. of molybdenum, includes a main wire-mesh section 58 and a solid imperforate base section 59. An L-shaped abrading jet nozzle 52 is arranged to project axially into the cylindrical blank-and-mask assembly with its discharge outlet projecting radially outward toward the wall of mask 57. Somewhat as in the embodiment of FIG. 22, the cylindrical assembly including the blanks and mask is rotated while simultaneously nozzle 52 is reciprocated axially over substantially the full perforate section 58 of the mask. The abrading jet from nozzle 52 first cuts through the wall of inner blank 56, in the areas thereof exposed through the mesh of mask 57. After these areas have been completely cut away and the inner grid electrode is therefore completed, the operation is continued so that the abrading jet now cuts through the corresponding areas of the outer blank 55, thereby to form the outer grid electrode; this second stage of the process of course leaves the finished inner electrode unaffected. In this way both grid electrodes are formed with substantially registering mesh patterns. True, in view of the fact that the abrading jet from nozzle 52 is slightly diverging, the mesh openings formed by the jet in the outer blank 55 will be slightly larger than the openings in the inner blank 56. This is generally satisfactory, because in the normal operation of a multi-grid tube such as a tetrode, the apertures in the (outer) screen grid may be somewhat larger than the apertures in the (inner) control grid without interfering with the proper distribution of the electron current and with the correct operation of the tube. This would not normally be the case if the geometry of FIG. 23 were reversed i.e. with the mask positioned exteriorly of the outer blank 55 and the abrading jet discharged in a radially inward direction, in which case the mesh openings would tend to be larger in the inner than in the outer grid. In other words, it is important that the geometry of the abrading jet relative to the blanks during the machining process of the invention should generally simulate the geometry of the electron discharge relative to the grids during the operation of the finished tube. A further advantage of the layout described with reference to FIG. 23 is that it permits of a ready visual inspection for determining the precise moment when to stop the abrading of the outer blank 55, as was disclosed above with reference to FIGS. 8–11.

In cases where it is desired to control the size of the apertures formed in each of the two (or more) blanks such as 56 and 55 more precisely than is possible with the arrangement shown in FIG. 23, there may be used a generally similar layout with the provision of an individual mask associated with each individual blank; in other words, an additional mask 57a would be interposed between the blanks 56 and 55, having a mesh pattern corresponding with that of mask 57 in order more positively to control the mesh size of the apertures cut in outer blank 55.

To facilitate the mounting of the finished grids in the tube in proper registering relation, the abrading jet may be used to inscribe locating marks in both blanks 55 and 56 while the rotation of the blanks is arrested.

In some types of multi-grid tubes, the inter-grid spacing is too great to permit of satisfactorily applying the process described with reference to FIG. 23. The modified process shown in FIG. 24 can then be applied. An outer tubular blank 60 and an inner blank 61, both made of pyrolytic graphite, are here shown as having substantially different diameters. Inner blank 61 is mounted on circular base 66 secured on a shaft 68 drivable in rotation by means not shown. A tubular mask 62 is mounted a close sliding fit within inner blank 61 for bodily rotation therewith on base 66, mask 62 being shown as including a main mesh section 64 and solid end sections 63. Outer blank 60 is mounted on an annular base 67 secured on a tubular shaft 81 mounted for rotation in eccentric relation with respect to shaft 68, the arrangement being such that the outer and inner blanks 60 and 61 have their cylindrical walls substantially tangent to each other along a common generatrix. Outer shaft 81 is coupled for bodily rotation with inner shaft 68 by way of the meshing gears 71–70 and 69–82, as shown. The gear ratios are so selected that both shafts 68 and 81 are rotated at a common angular velocity. In an axial bore formed through inner shaft 68 and base 66, there is mounted an L-shaped abrading jet nozzle 65 which is mounted through means not shown for non-rotating, axial reciprocation across the height of the mesh section 64 of mask 62, with its outlet directed radially towards the common tangential area of blanks 60 and 61. It will be apparent that with this arrangement both blanks will be abraded in similar patterns as determined by the common mask 62, in spite of the substantial difference in diameter between the blanks.

The processes disclosed with reference to FIGS. 21–22, 23 and 24 are applicable, mutatis mutandis, to the production of electrodes having other than the cylindrical shapes shown, e.g. flat, part-spherical, etc.

In all the embodiments referred to, the abrading process may be monitored by any suitable means instead of or in addition to visual inspection. Thus the monitoring means may include thickness gauges, transparency inspection using a light beam from a source situated at one side of the blank and a photoelectric cell at the other side capacitance indicating means with a pair of electrodes positioned on opposite sides of the blank, optical contour-detecting means, and other devices that will readily suggest themselves.

The methods of the invention provide a very important advance in the industrial production of pyrolytic graphite electrodes for electron discharge tubes. Among the many advantages of these methods, is the fact that the mesh openings and intervening solid areas of the electrodes can be obtained with a degree of dimensional precision unparalleled by prior methods, for example openings and strips of widths substantially less than one-tenth of a millimeter, while at the same time greatly reducing the number of rejects due to breakage and chipping of the relatively expensive pyrolytic graphite from which the blanks are made.

In the over-all process of producing pyrolytic graphite perforate electrodes according to the invention, the initial step which involves providing the blank made of pyrolytic graphite, is per se known being disclosed e.g. in the above-identified common-assigned Pat. 3,307,063. Thus, a cylindrical support made of ordinary graphite may be placed in an electric tunnel furnace heated to about 2000°C. and a stream of methane or other hydrocarbon may be passed through the furnace. The hydrocarbon compound breaks down and the carbon deposits over the surface of the cylindrical support in the form of the desired oriented layers of pyrolytic graphite. After a predetermined time determined by the desired depth of the deposited layer, the coated graphite support is allowed to cool and the pyrolytic graphite shell is then easily separated from its underlying cylindrical support to provide the blank used in the process of this invention.

What I claim is:

1. A method of making a perforate electrode for an electron discharge device from a blank, comprising the steps of:

discharging a jet of abrading material and directing the jet to impinge on one wall surface of said blank;

restricting the areas of impact of said jet on said wall surface to a predetermined pattern by means of a mask;

continuing the discharge of said jet until the wall of said blank has been completely perforated in accordance with said pattern; and then discharging a jet of abrading material and directing the jet to impinge on the opposite surface of said wall in the area of said perforation to enlarge at least a portion of the perforation, to thereby produce a perforated electrode having improved characteristics.

2. The method of claim 1 wherein said jets impinge the walls of said blank at predetermined angles to form perforations having a desired configuration.

3. A method of making at least two perforate generally cylindrical electrodes having generally similar perforation patterns from a corresponding number of blanks, which electrodes are to be substantially coaxially mounted in a common electron discharge device with their perforation patterns in registering relation, comprising the steps of:

rotatably mounting said blanks about their longitudinal axes with their longitudinal axes being parallel and the blanks being eccentric with respect to each other, a smaller-diameter blank being mounted inside a larger-diameter blank;

positioning a mask having a given perforation pattern thereon adjacent to the inner surface of the inner blank for rotation with said inner blank;

discharging a jet of abrading material and directing the jet to impinge on the inner surface of said inner blank through said mask;

rotating said blanks and mask at a common angular velocity, said jet being directed from the interior of said inner blank through said mask at the surfaces of the blanks in the region where said eccentrically mounted, rotating blanks are closest each other; and continuing the discharge of abrading material until the wall of each blank has been fully perforated in accordance with the perforation pattern on said mask.

4. The method of claim 3 further comprising interposing a second mask between said blanks.

5. The method of claim 4 wherein said first and second masks have corresponding perforation patterns to more positively control perforation of said blanks.

6. A method of making at least two perforate generally cylindrical electrodes having generally similar perforation patterns from a corresponding number of blanks, which electrodes are to be substantially coaxially mounted, one within the other, in a common electron discharge device with a given radial inter-electrode spacing and with the perforation patterns in registering relation, comprising the steps of:

positioning a mask having a wall thickness equal to said radial inter-electrode spacing and having a given perforation pattern adjacent to the outer surface of the inner blank corresponding to the inner electrode;

discharging a jet of abrading material and directing the jet to impinge on the outer surface of said inner blank through said mask to perforate said inner blank in accordance with said pattern to form said inner electrode;

positioning said mask adjacent the inner surface of the outer blank corresponding to the outer electrode; and discharging a jet of abrading material and directing the jet to impinge on the inner surface of said outer blank through said mask to perforate said outer blank in accordance with said pattern to form said outer electrode.

7. The method of claim 6 wherein said mask is a cylindrical mask.

8. The method of claim 6 comprising the step of rotating said mask and blanks relative to said jet while discharging said jet to perforate said blanks.

References Cited

UNITED STATES PATENTS

| | | | |
|---|---|---|---|
| 767,362 | 8/1904 | Phillips | 51—310 |
| 2,358,710 | 9/1944 | Helgeson | 51—311 |
| 2,364,536 | 12/1944 | Kent | 29—25.17 |
| 3,305,748 | 2/1967 | Pehe et al. | 313—348 |
| 3,307,063 | 2/1967 | Sarrois | 313—348 |

JOHN F. CAMPBELL, Primary Examiner

R. B. LAZARUS, Assistant Examiner

U.S. Cl. X.R.

29—25.17; 51—311, 312